Jan. 13, 1959 T. McCLOUGHY 2,868,478
ROCKET CONTROL
Filed May 5, 1954 5 Sheets-Sheet 1
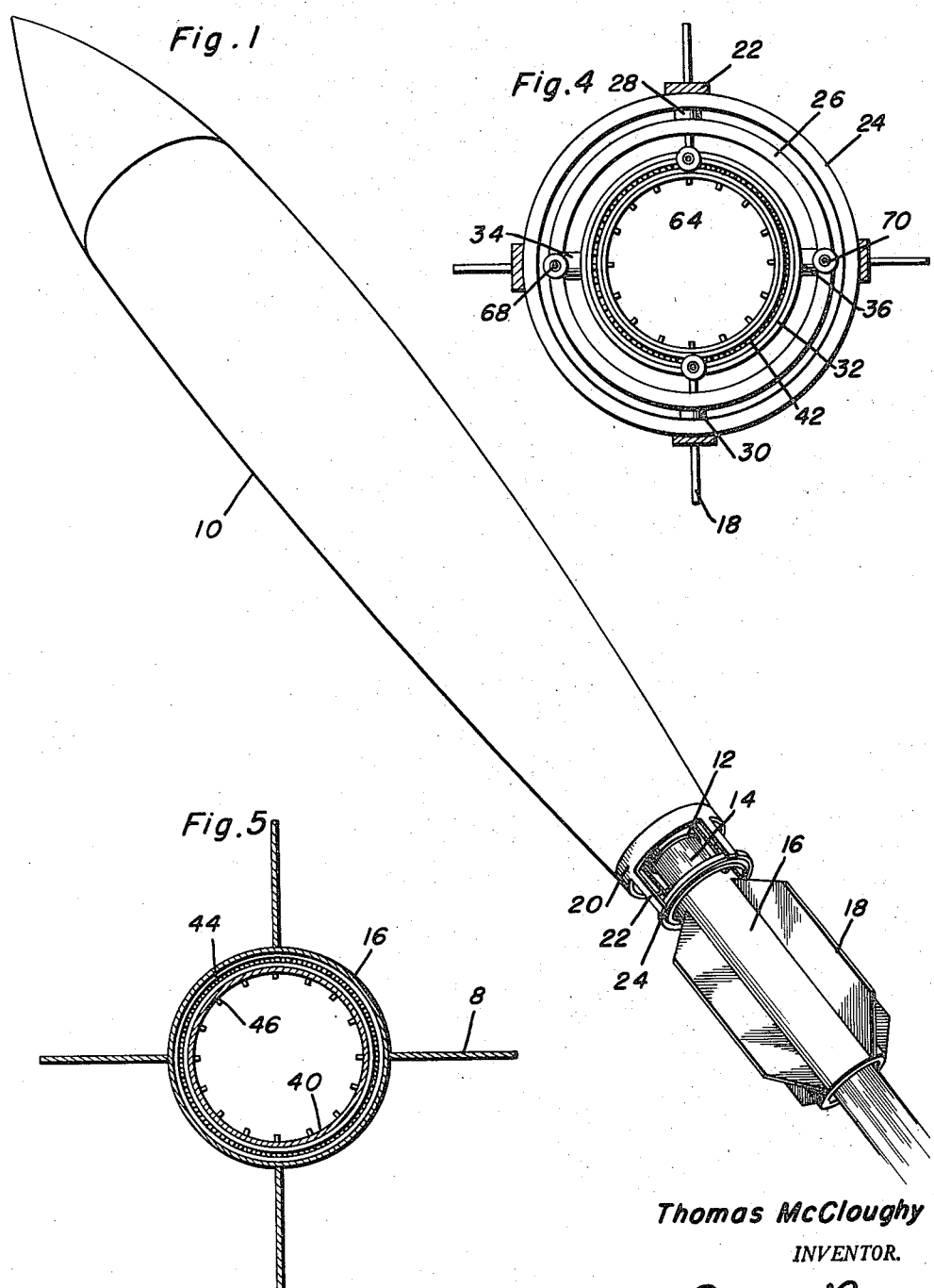
Thomas McCloughy
INVENTOR.

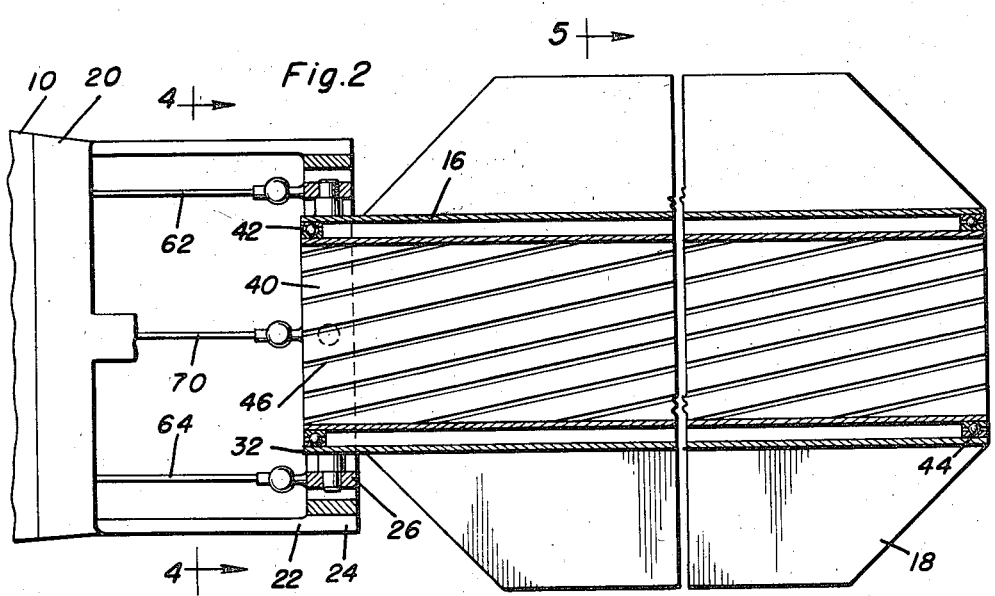
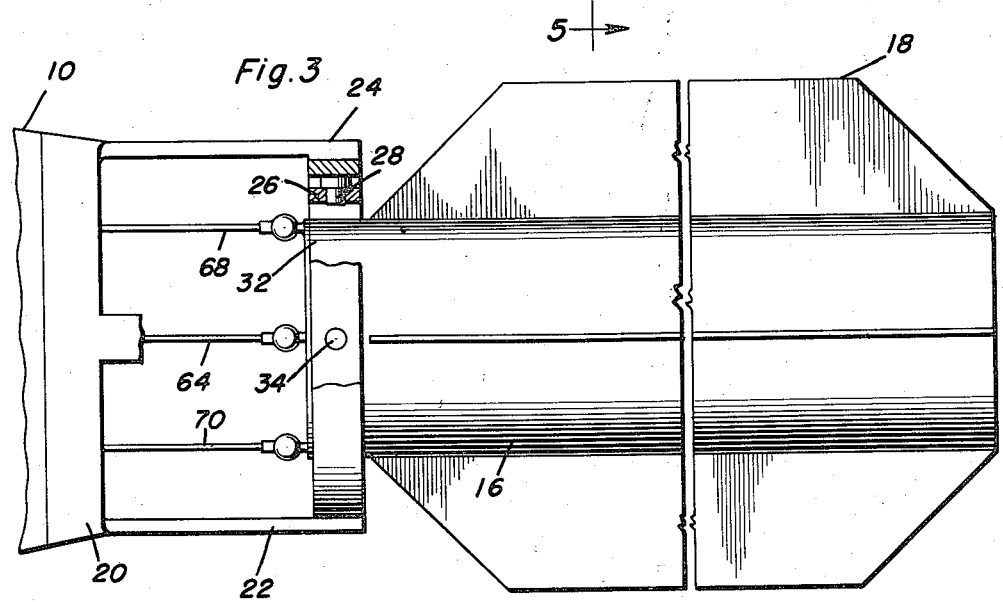

Jan. 13, 1959   T. McCLOUGHY   2,868,478
ROCKET CONTROL
Filed May 5, 1954   5 Sheets-Sheet 3
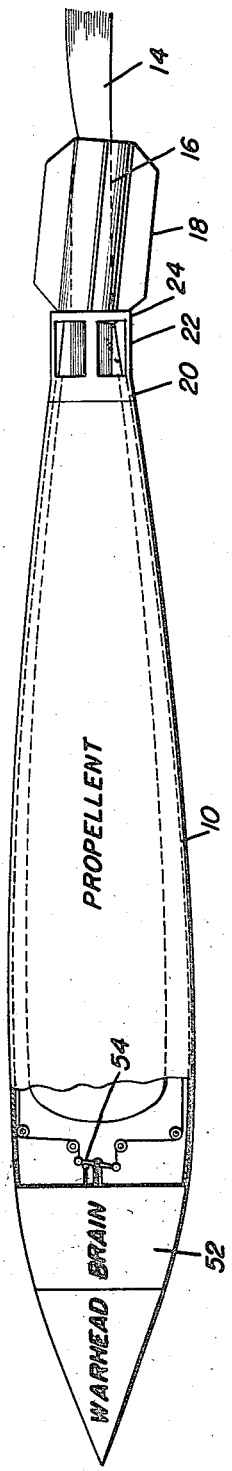
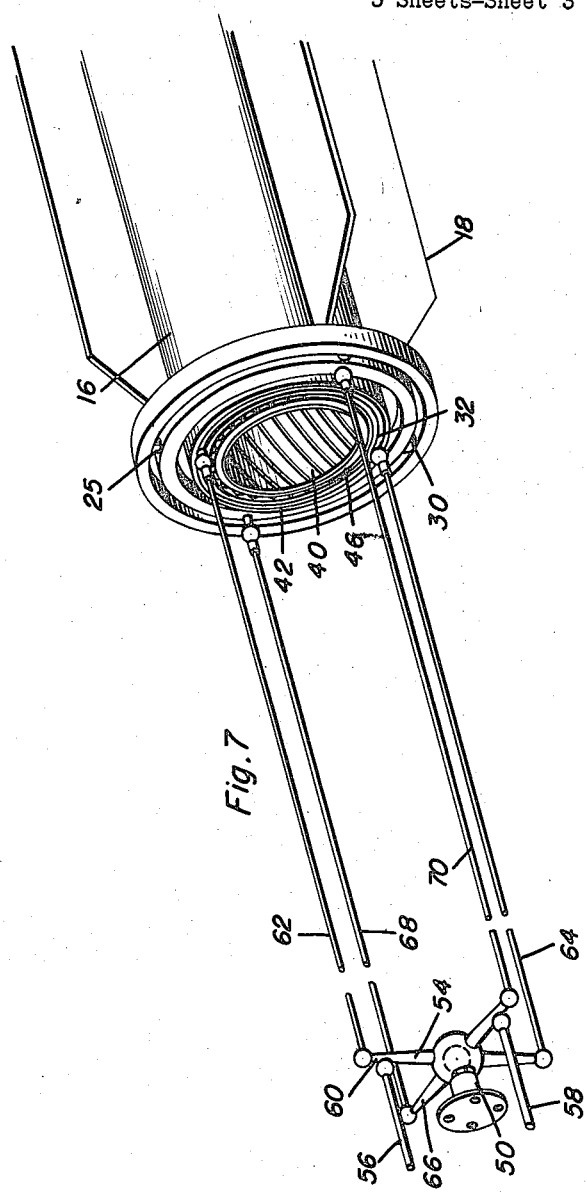
Thomas McCloughy
INVENTOR.
BY *[signatures]*
Attorneys

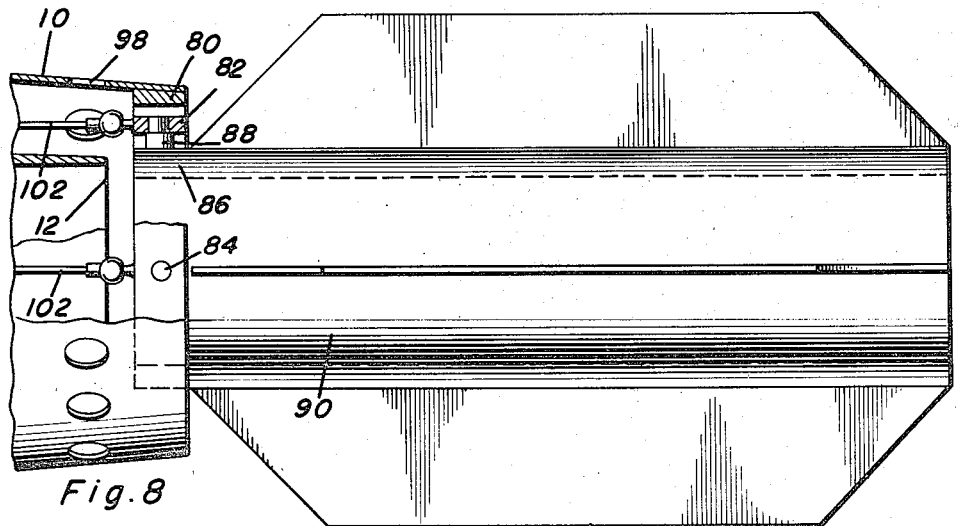
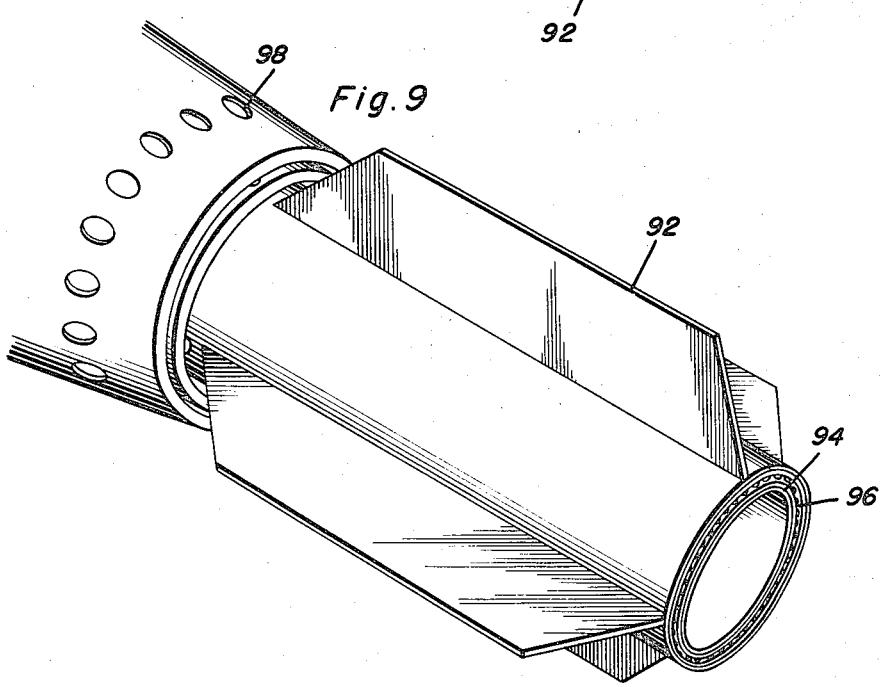

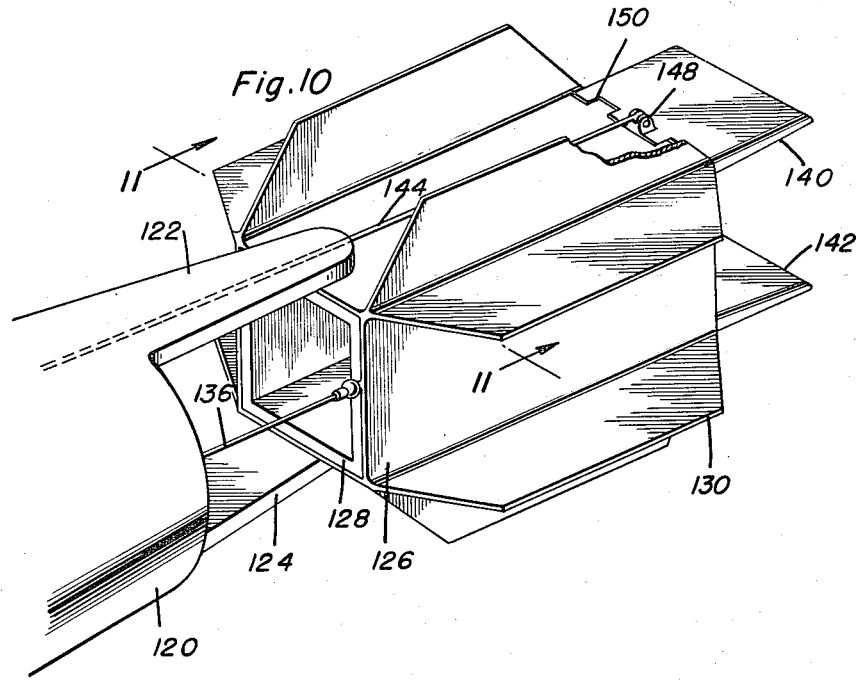
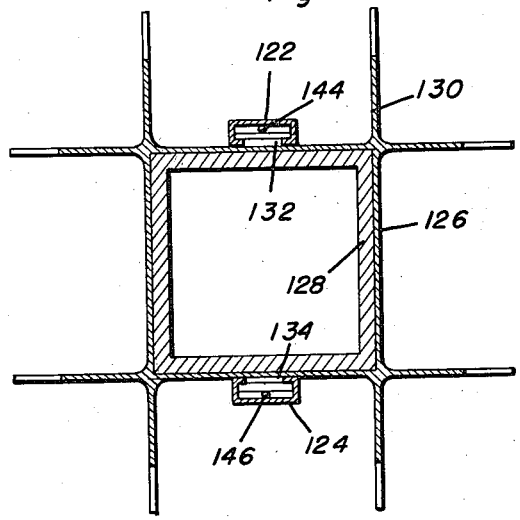
Thomas McCloughy
INVENTOR.

United States Patent Office 2,868,478
Patented Jan. 13, 1959

2,868,478

ROCKET CONTROL

Thomas McCloughy, Morris Plains, N. J.

Application May 5, 1954, Serial No. 427,698

6 Claims. (Cl. 244—14)

This invention relates to a rocket control, and particularly to a steering device to be applied to a reaction driven vehicle of any type.

In the operation of guided missiles such as rockets, turbo jets and ram jets, it is frequently desirable to provide control equipment so that the device may be controlled either from a ground station or from a following aircraft or even from a recorded control device. Heretofore, considerable difficulty has been encountered in causing proper steering of the rocket or other reactor driven devices so that the controlling of the rocket does not interfere with the drive of the device.

The present invention relates to a controller to be connected on the rear end of such a reactor driven device so that the controller may be deflected into engagement with the periphery of the reaction driving stream so that the controller may be activated to cause steering action to the vehicle.

In the construction according to the present invention, the device has a substantially tubular tail member mounted in gimbals or swivel arrangement on the rear end of the device in surrounding relation to the reaction stream and means are provided for deflecting the tail member into engagement with the periphery of the reaction stream to apply a turning effect so that the vehicle may be steered.

While any suitable device may be utilized for operating the steering control, I prefer to provide a cruciform swivel lever which is controlled by an electronic guiding device of any known or desired type so that the cruciform lever may be shifted to cause motion of the tail in any desired direction to produce a steering effect on the vehicle.

It is accordingly an object of the invention to provide an improved control device for reaction driven vehicles.

It is a further object of the invention to provide a control device which will impinge the periphery of the reactor stream.

It is a further object of this invention to provide a control device which will be swivelly mounted on the after end of a reactor driven device.

It is a further object of the invention to provide a control device having a rotating surface opposed to the reactor stream.

Other objects and many of the attendant advantages of the present invention will be apparent from the following detailed description taken in conjunction with the accompanying drawing in which:

Figure 1 is a perspective view of a guided missile of the rocket type having a controller according to the present invention;

Figure 2 is an enlarged sectional elevation of the control assembly;

Figure 3 is an elevation of the control assembly with parts broken away and in section;

Figure 4 is a cross-section through the mounting of the control element taken substantially on the plane indicated by the section line 4—4 of Figure 2;

Figure 5 is a cross-section through the control assembly taken substantially on the plane indicated by the section line 5—5 of Figure 2;

Figure 6 is an elevation with parts broken away and in section showing the control mounted in a rocket type vehicle;

Figure 7 is a perspective view of the control assembly;

Figure 8 is an elevation partially in section of a modification according to the invention;

Figure 9 is a perspective view of the control assembly as shown in Figure 8;

Figure 10 is a perspective view of a further modification according to the invention; and Figure 11 is a cross-section through the modification of Figure 11 taken substantially on the plane indicated by the section line 11—11 of Figure 10.

For simplicity of illustration, the guided vehicle is indicated as a rocket propelled missile, although it will be evident that any type of reaction powered device may be so controlled.

The vehicle indicated generally as the missile 10 has a reaction nozzle 12 through which a reaction stream 14 issues. In the simplified embodiment according to the invention, the control member comprises a substantially tubular casing 16 having stabilizing fins 18 thereon. The control body 16 is mounted in spaced relation to the jet nozzle 12 by means of a mounting assembly comprising a base ring 20 and extending arms 22 which support an outer mounting ring 24. An outer gimbal or swivel ring 26 is mounted in the mounting ring 24 by means of suitable pivots 28 and 30. An inner gimbal ring 32 is mounted in the outer ring 26 by means of pivots 34 and 36. The axis of the pivots 34 and 36 being at right angles to the axis of the pivots 28 and 30. The body 16 being directly mounted on the inner gimbal ring 32 and extending rearwardly therefrom and being of sufficient size so that the reaction stream passes readily therethrough without contact therewith. In order to protect the control device, a liner 40 of refracting material is placed therein and is mounted for rotation therein by means of the antifriction bearings 42 and 44. The inside of the liner 40 is provided with a plurality of rifling-like ridges 46 which extend spirally around the inner surface of the liner 40 so that when the liner is deflected into proximity with the reaction stream, the stream will cause a rotation of the liner to prevent spot heating and possible destruction of the liner.

In the control device for the control assembly, a pivot point 50 is mounted in the body of the vehicle adjacent to a suitable control device, such as the usual electronic guiding device 52. A cruciform control arm 54 is mounted on the pivot 50 and is uniformly and universally movable thereabout. In order to adjust the cruciform arm 54, a control member 56 is connected to one arm of the cross, and a control member 58 is connected to the other arm of the cross so that either or both may be moved in any direction as may be desired to cause universal movement of the cruciform arm 54. The cruciform arm 54 is connected to the control assembly by connecting to the gimbal rings. One arm 60 of the cruciform lever is provided with control cables 62 and 64 which are connected to the inner gimbal ring 32 at a point diametrically transverse to the axis between the pivots 34 and 36. Likewise, the arm 66 of the cruciform lever 54 is provided with control cables 68 and 70 which are connected to the outer gimbal ring 26 at a point diametrically transverse to the swivel members 28 and 30.

In the operation of this form of the device, the members 16 will normally be maintained in axially positioned trailing relation with respect to the guided missile or other reaction powered vehicle and normally will be maintained in spaced relation from the reactor stream 14 so that it will in no wise affect the power or control of the device. When the guiding device 52 is properly energized, the lever 54 will be moved by the control rods 56 and 58 so that the cross-arms 60 and 66 will be moved as desired to cause rotation of the gimbal devices or swivel mounting about their axis of rotation so that the entire device will be swiveled to bring a portion of the liner 40 into contact with the perimeter of the reactor stream so that power will be applied thereto to cause a turning motion of the vehicle. Obviously, the guiding device may be of any type such as a compact radio receiver receiving impulses from the ground or any other control sending set or it may be a tape recorder or other similar device so that the device once set in motion will follow a predetermined course until the propellant has been exhausted or until the device strikes an object.

The modification according to Figures 8 and 9 shows that the arms 22 have been dispensed with and the outer mounting ring 80 is mounted in the outer shell of the vehicle 10 and the inner gimbal ring 82 is pivotally mounted on the mounting ring 80 by means of diametrically opposed pivots 84. The inner gimbal ring 86 is mounted in the outer gimbal ring 82 by means of the pivots 88. A tubular control body 90 having the fins or stabilizers 92 thereon is mounted directly on and is preferably a portion of the inner gimbal ring 86, and if desired, the liner 94 of refractory material may be mounted by means of suitable outer friction bearings 96 so that the entire device may be rotated in the same manner as the liner 40.

Preferably apertures 98 are provided in the outer shell of the vehicle 10 to permit a flow of cooling air over the gimbal mounting members so that they may be maintained in proper cooled condition and so that suitable cooling air may be admitted into the vicinity of the reaction stream. Due to the additional introduction of air to the jet exhaust stream and the proximity of the controls to it experiments have shown that a muffling effect is caused which greatly reduces or eliminates the noise in take-off and landing. The control cables 100 and 102 are substantially identical to the control cables 62, 64, 68 and 70.

In the modification according to Figures 10 and 11, the vehicle body 130 is provided with a pair of rearwardly extending arms 122 and 124 on which is pivoted a substantially rectangular control body 126 having a refractory lining 128. Suitable stabilizing fins or guides 130 are provided on the exterior surface of the substantially rectangular member 126. The member 126 is pivotally mounted on the arms 122 and 124 by means of pivot members 132 and 134 which are journaled in the ends of the arms 122 and 124. Control cables 136 are connected to the sides of the member 126 at an axis at right angles to from the axis between the pivot points 132 and 134. It will thus be apparent that by moving the cables 136, the device may be moved laterally into the perimeter of the reaction stream passing through the refractory lining 128. A pair of control flaps 140 and 142 are journaled on the rear end of the member 136 and are controlled by means of control cables 144 and 146 which extend through the arms 122 and 124, respectively, and are connected to suitable arms 148 mounted on the flaps 140 and 142, respectively, while the flaps are mounted by means of hinges 150.

In the operation of this form of the device, the device is controlled by means of cables 136 for lateral motion of the controller, and the flaps 140 and 142 are controlled by means of the cables 144 and 146 for vertical control of the device so that either vertical or horizontal control may be had, as is desired.

The fins 18 are so designed and positioned that after cessation of the reaction stream and during motion of the vehicle, the fins control the device with substantially the same efficiency as the usual control fins heretofore mounted on such vehicles. Thus, the present control device will not only operate with extreme efficiency during the propulsion period, but will also control the device during the entire motion period of the vehicle.

For simplicity of illustration, a simple type of vehicle and a simple single unit reaction stream has been shown. However, it is apparent that any desired number of reaction streams or any type of vehicle may be so controlled.

For purposes of exemplification, particular embodiments of the invention have been shown and described according to the best present understanding thereof. However, it will be apparent to those skilled in the art that various changes and modifications in the construction and arrangement of the parts thereof may be readily resorted to without departing from the true spirit and scope of the invention.

What is claimed as new is as follows:

1. For use with a vehicle having a reaction driving stream, a steering device comprising an elongated housing pivotally connected for universal motion with respect to the vehicle, said housing extending in spaced surrounding relation to the reaction stream of the vehicle, means for pivoting said housing to cause a portion of said housing to engage the perimeter of the reaction stream, said housing being substantially tubular, and a lining of refractory material rotatably mounted in said housing.

2. For use with a vehicle having a reaction driving stream, a steering device comprising an elongated housing pivotally connected for universal motion with respect to the vehicle, said housing extending in spaced surrounding relation to the reaction stream of the vehicle, means for pivoting said housing to cause a portion of said housing to engage the perimeter of the reaction stream, said housing being substantially tubular, a lining of refractory material rotatably mounted in said housing, and spiral impeller projections on the inner surface of said liner.

3. In a reaction driven vehicle having a nozzle through which the reaction stream passes, a steering system comprising an elongated housing extending adjacent said nozzle, a first mounting ring pivotally secured to the vehicle, a second mounting ring pivoted on said first mounting ring, the pivoting axis of said rings being transverse to each other, said housing being mounted on said second mounting ring, the reaction stream from said nozzle flowing freely through said housing, a cruciform steering lever mounted for universal motion in said vehicle, one cross-leg of said lever being operatively connected to the first mounting ring, the other cross-leg of said lever being operatively connected to the second mounting ring.

4. In a reaction driven vehicle having a nozzle through which the reaction stream passes, a steering system comprising an elongated housing extending adjacent said nozzle, a first mounting ring pivotally secured to the vehicle, a second mounting ring pivoted on said first mounting ring, the pivoting axis of said rings being transverse to each other, said housing being mounted on said second mounting ring, the reaction stream from said nozzle flowing freely through said housing, a cruciform steering lever mounted for universal motion in said vehicle, one cross-leg of said lever being operatively connected to the first mounting ring, the other cross-leg of said lever being operatively connected to the second mounting ring, said housing being substantially tubular.

5. In a reaction driven vehicle having a nozzle through which the reaction stream passes, a steering system comprising an elongated housing extending adjacent said nozzle, a first mounting ring pivotally secured to the vehicle, a second mounting ring pivoted on said first mounting ring, the pivoting axis of said rings being transverse to each other, said housing being mounted on said second mounting ring, the reaction stream from said nozzle flowing freely through said housing, a cruciform steering lever mounted for universal motion in said vehicle, one cross-leg of said lever being operatively connected to the first mounting ring, the other cross-leg of said lever being operatively connected to the second mounting ring, said housing being substantially tubular, a liner of refractory material rotatably mounted in said housing.

6. In a reaction driven vehicle having a nozzle through which the reaction stream passes, a steering system comprising an elongated housing extending adjacent said nozzle, a first mounting ring pivotally secured to the vehicle, a second mounting ring pivoted on said first mounting ring, the pivoting axis of said rings being transverse to each other, said housing being mounted on said second mounting ring, the reaction stream from said nozzle flowing freely through said housing, a cruciform steering lever mounted for universal motion in said vehicle, one cross-leg of said lever being operatively connected to the first mounting ring, the other cross-leg of said lever being operatively connected to the second mounting ring, said housing being substantially tubular, a liner of refractory material rotatably mounted in said housing, said first mounting ring being longitudinally spaced from said nozzle.

References Cited in the file of this patent

UNITED STATES PATENTS

| | | |
|---|---|---|
| 1,250,178 | Hover | Dec. 18, 1917 |
| 1,879,187 | Goddard | Sept. 27, 1932 |
| 2,217,649 | Goddard | Oct. 8, 1940 |
| 2,420,323 | Meyer | May 13, 1947 |
| 2,537,487 | Stone | Jan. 9, 1951 |
| 2,584,826 | Wyckoff | Feb. 5, 1952 |
| 2,620,622 | Lundbery | Dec. 9, 1952 |
| 2,621,871 | Robert | Dec. 16, 1952 |
| 2,654,334 | Wheeler | Oct. 6, 1953 |
| 2,681,548 | Kappus | June 22, 1954 |